(12) United States Patent
Kim et al.

(10) Patent No.: US 6,278,950 B1
(45) Date of Patent: Aug. 21, 2001

(54) TURNING-WAVE AMPLITUDE INVERSION

(75) Inventors: Young C. Kim, Houston; Arturo E. Romero, Jr., Sugar Land; Michael M. Deal, Houston, all of TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 0 days.

(21) Appl. No.: 09/517,365

(22) Filed: Mar. 2, 2000

(51) Int. Cl.$^7$ .................................................. G01V 1/28
(52) U.S. Cl. ................................................. 702/17; 367/47
(58) Field of Search ................................ 702/14, 17, 18; 367/38, 47

(56) References Cited

PUBLICATIONS

R. E. Sheriff and L. P. Geldart, *Exploration Seismology*, Second Edition, Cambridge University Press, Cambridge, MA, 1995, p. 98.

A. van der Sluis and H. A. van der Vorst, "SIRT– and CG–Type Methods for the Iterative Solution of Sparse Linear Least–Squares Problems", *Linear Algebra and its Applications*, 130, New York, NY, 1990, pp. 257–303.

J. E. Dennis, Jr. and Robert B. Schnabel, Numerical Methods for Unconstrained Optimization and Nonlinear Equations, The Society for Industrial and Applied Mathematics, Philadelphia, PA, 1996, pp. VII–X.

Dave Hale, N. Ross Hill and Joseph P. Stefani, "Imaging Salt with Turning Seismic Waves", SEG 61st Annual Meeting, 1991, pp. 1171–1174.

Christopher C. Paige and Michael A. Saunders, "LSQR: An Algorithm for Sparse Linear Equations and Sparse Least Squares", *ACM Transactions on Mathematics Software*, vol. 8 No. 1, Mar. 1982, pp. 44–56, 58–63, 65, 68, 70, 71.

Matthew A. Brzostowski and George A. McMechan, "3–D tomographic imaging of near–surface seismic velocity and attenuation", *Geophysics*, vol. 57 No. 3, Mar. 1992, pp. 396–403.

*Primary Examiner*—Donald E. McElheny, Jr.
(74) *Attorney, Agent, or Firm*—J. Paul Plummer

(57) ABSTRACT

A method for compensating for amplitude loss in a set of seismic traces, where the amplitude loss is caused by shallow attenuation anomalies. Attenuation factors are calculated from first-arrival amplitudes for long-offset seismic data traces. Those factors are calculated by numerical methods, using matrix inversion and iteration. Those factors are used to adjust upward the amplitudes of all later-arriving seismic traces. Frequency dependent attenuation is treated by dividing the seismic traces into frequency ranges using band-pass filters, then using the above-described method within each frequency range after which the adjusted amplitudes are recombined. Amplitude variations caused by inconsistencies in the data acquisition system, such as a source strength variation, are also treated by a similar approach.

16 Claims, 2 Drawing Sheets

TURNING-WAVE AMPLITUDE INVERSION

FIELD OF THE INVENTION

This invention relates to the field of seismic prospecting. More particularly, the invention is a method for compensating for amplitude variations in seismic records due to shallow attenuation anomalies such as gas clouds or gas-charged channels, or inconsistencies in the data acquisition system such as variations in source strength.

BACKGROUND OF THE INVENTION

When gas accumulations or other attenuation anomalies exist at shallow depths, they produce two detrimental effects on seismic data. One is the amplitude loss due to attenuation, and the other is wavefront distortion due to severe lateral velocity contrasts. As a result, the amplitudes of reflections from subsurface horizons below gas clouds or other anomalies are usually very low, making it difficult to identify such reflections. Such amplitude attenuation also diminishes or destroys the value of seismic amplitudes as an attribute for estimating reservoir properties.

One way to mitigate the problem of low amplitude is to apply automatic gain control (AGC) that almost equalizes the reflection amplitude. Although AGC is a powerful tool for revealing attenuated seismic reflections particularly when the reflection amplitude varies significantly), AGC destroys the amplitude integrity of the reflections thereby making attribute analysis meaningless.

Another class of amplitude compensation methods is based on a priori information. For example, if the reflection coefficient of a particular horizon below a shallow anomaly is known to be constant, but the reflection amplitudes from the horizon vary due to the anomaly, then one can generate scale factors that will force the amplitudes of reflections from the horizon to be constant and apply them to the seismic traces to correct the amplitudes of reflections from other horizons affected by the anomaly. However, this approach requires a priori knowledge about the reflection coefficient of a particular horizon. Otherwise, the method will blindly make the reflection amplitudes constant along the horizons, making the amplitudes unsuitable for amplitude analysis.

Without invoking any a priori assumptions about the amplitudes of reflections from a horizon, Brzostowski and McMechan discuss a way of estimating near-surface attenuation that could be used to mitigate amplitude variations caused by near-surface heterogeneities. (Brzostowski, M. A. and McMechan, G. A., "3-D tomographic imaging of near-surface seismic velocity and attenuation," *Geophysics*, 57, 393–406 (1992)). Unfortunately, their method requires a near-surface velocity profile to estimate the attenuation. Also, the method would be unstable if the ratio of observations to unknowns is low, which usually will be the case if one attempts to determine the attenuation for each cell for a near-surface volume. The authors qualitatively compare their attenuation model to near-surface geologic features, but the accuracy and resolution are insufficient to be used to correct any amplitude variations due to the near-surface heterogeneities.

Thus, there is a need for a method for determining surface-consistent attenuation scale factors without requiring either a near-surface velocity profile or any a priori assumptions about the amplitudes of reflections from horizons below shallow attenuation anomalies. The present invention satisfies this need.

SUMMARY OF THE INVENTION

In one embodiment, the present invention is a method for compensating for amplitude loss in a set of seismic traces, where the amplitude loss is caused by shallow attenuation anomalies. The method comprises the steps of (a) determining first-arrival amplitudes for long-offset seismic data traces; (b) inverting the first-arrival amplitudes to determine attenuation scale factors; and (c) using the attenuation scale factors to adjust the amplitudes of all later-arriving seismic traces of whatever offset in the data set. The offset in step (a) above must be sufficiently large that a turning wave (which will be the first arrival) that arrives at the receiver will pass completely through the shallow layer containing attenuation anomalies, following a nearly vertical path.

In another embodiment, the invention is extended to better treat situations where the shallow attenuation may be frequency dependent. A bank of band-pass filters is first applied to the seismic traces to separate the data into a series of filtered data traces having different frequency content, and then the previously described inventive method is applied to each set of band pass filtered seismic traces, which are then recombined after being scaled by the appropriate frequency-dependent attenuation scale factor.

In a third embodiment, the invention is extended to also include the effects of inconsistencies in the data acquisition system. In addition to inverting the first arrival amplitudes for long offsets to obtain attenuation scale factors to compensate for shallow attenuation anomalies, the same first arrival amplitudes can be used to simultaneously invert for fluctuations in the acquisition system. For example, the present invention in this embodiment can be used to estimate variations in source strength or receiver variations. As in the first embodiment described above, the estimates for source strength variations or changes in the gain of the recording system can be used to remove the effects of these inconsistencies in the acquisition system from the seismic data.

BRIEF DESCRIPTION OF THE DRAWINGS

The present invention will be better understood by referring to the following detailed description and the attached drawings.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that may be included within the spirit and scope of the invention, as defined by the appended claims.

DETAILED DESCRIPTION OF THE PREFERRED EMBODIMENTS

The present inventive method is a deterministic approach to estimate the near-surface attenuation structure, where surface-consistent scale factors can be derived. These scale factors are then applied either to pre-stack or post-stack data to compensate for the amplitude loss caused by near-surface attenuation.

When seismic velocity increases with depth, as is generally the case, a portion of the wavefront that originated from a source at the surface will turn and travel back to the surface without being reflected from any subsurface horizons. This is called a "turning wave" or, as it is sometimes referred to, a "turning ray." See Sheriff, R. E. and Geldart, L. P., *Exploration Seismology*, 2nd Ed., New York, Cambridge University Press (1995). Turning waves (also called diving waves) are continuously refracted waves that return to the surface in response to the velocity increase with depth (see FIG. 1). Turning wave amplitudes are independent of the reflection coefficients of deeper horizons. Since turning waves are typically first arrivals (except for the direct arrivals at short offsets), they are less prone to contamination from other arrivals such as reflections, converted waves or multiple reflections.

Figure 1:
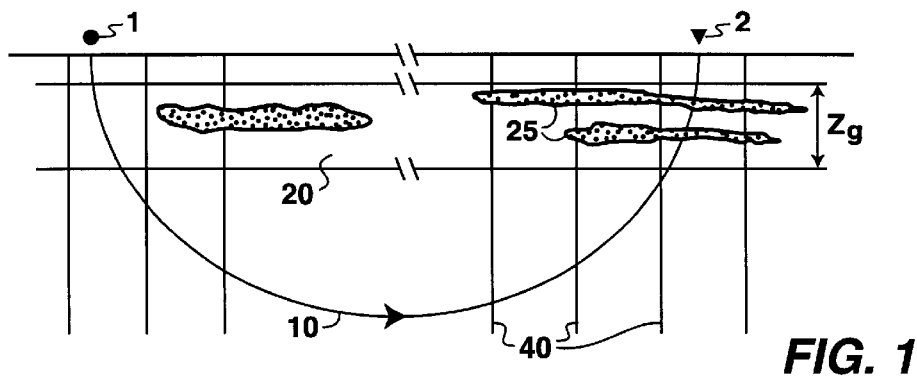
FIG. 1 shows the path of a turning wave proceeding from seismic source to distant receiver passing twice through a shallow near-surface region containing attenuation anomalies.

In FIG. 1, the seismic wave 10 leaves the source 1, passing first through shallow layer 20 containing attenuation anomalies 25, before turning and passing back upward through shallow layer 20 to reach receiver 2. If the source and receiver are sufficiently far apart, the turning wave 10 will pass completely through shallow region 20, and then back through the shallow region again as it returns to the surface. The tuning wave is identifiable in practice because it should be the first wave to arrive at a receiver from a given source. Even the direct wave from source 1 to receiver 2 typically will arrive after the turning wave because of the velocity increase with depth. The reflected waves from deeper horizons arrive later because they travel much longer distances due to the fact that these reflectors are considerably deeper than shallow layer 20. Moreover, because they come from relatively deep horizons, the reflected waves will traverse the shallow layer 20 in a nearly vertical direction, duplicating the experience of the turning wave in that regard. Thus, the long-offset turning wave and the deep reflections have similar ray paths with respect to the shallow region 20.

If attenuation anomalies are located only at shallow depths, the amplitudes of the first arrivals (i.e., the turning waves) will be determined mostly by the attenuation profile of the near surface. By inverting the amplitudes of the first arrivals with long offsets, the near-surface attenuation profile can be obtained and it can be used to scale the amplitude of reflections from deeper reflectors. Since source strength also affects seismic amplitudes, the present inventive method can also be used to simultaneously invert the first arrival data for both the near-surface attenuation profile and for source strength variations. The latter estimates can then be used to remove the effect of source strength fluctuations from the seismic data.

Consider first the case with shallow attenuation anomalies but no source strength fluctuations. Suppose the near surface is discretized into a grid of rectangular cells by the vertical lines 40 shown in FIG. 1, with the cells small enough such that constant attenuation may be assumed within each cell. A source 1 is assumed to be over the i-th cell and a receiver 2 is over the j-th cell. Let $$A_{ij} = A_{ref} \exp[-(\alpha_i + \alpha_j) z_g] \quad (1)$$

where $A_{ij}$ is the amplitude of the first arrival from the source located above the i-th cell to the receiver located above the j-th cell; $A_{ref}$, a reference amplitude (discussed further below); $\alpha_i$ and $\alpha_j$, the attenuation coefficients for the turning wave vertically propagating through the i-th cell and the j-th cell, respectively; and $z_g$, the thickness of the layer that may contain gas clouds or other attenuation anomalies. The layer thickness $z_g$ may be estimated from seismic sections. Its value is not critical. Note that $z_g$ may be removed from equation (1) in which case $\alpha_i$ will represent the product of the attenuation coefficient for the i-th cell and the layer thickness of the i-th cell, and $\alpha_j$ will represent the product of the attenuation coefficient for the j-th cell and the layer thickness of the j-th cell. It will be obvious to those trained in the art that the present invention is not forced to assume that all attenuation anomalies have constant layer thickness. Although $z_g$ is treated in the equations as a constant, actual thickness variations are absorbed into the $\alpha_i$.

Values must be chosen for $A_{ref}$. The objective is to pick reference amplitudes that are not affected by any attenuation anomalies. There are various approaches for doing this, among which are the following: $A_{ref}$ may be determined from a measure of the source strength, where that can be determined. Or, $A_{ref}$ may be taken from a receiver outside the target region where it is known that there are no attenuation anomalies. Often, neither of these two approaches may be feasible. In such case, other possible approaches to fixing values for $A_{ref}$ include: (1) $A_{ref}$ may be determined from common-offset amplitudes, with $A_{ref}$ being a function of offset. For example, $A_{ref}$ may be the maximum amplitude for a given offset, or the average amplitude for a given offset. (2) $A_{ref}$ may be chosen in similar ways from common receiver amplitudes or common source amplitudes. Each of these methods and other possible choices offer different offsetting advantages and disadvantages in particular settings.

Selecting $A_{ref}$ values as the average amplitude for each common offset has the following advantages in that such a method tends to (1) correct for geometric spreading (spherical divergence); (2) isolate local site effects below the source and receiver; (3) equalize the contributions to the inversion from all offsets, increasing data redundancy; and (4) produce a normalization that reflects the differential attenuation between the average amplitude for each offset and the observed amplitude for each ray path.

Selecting $A_{ref}$ as the maximum first arrival amplitude for each offset will be a good choice if there are at least a few turning waves for each offset that do not encounter attenuation in the shallow region. This approach should be used with caution because of this assumption and because the method is prone to noise spikes. It may be desirable to use amplitude smoothing, preferably median filtering, before choosing $A_{ref}$.

While $A_{ref}$ is generally found above by averaging over all i,j (source, receiver) combinations with a common offset, $A_{ref}$ could for simplicity further be averaged over all offsets to a single constant, with the data first corrected for spherical divergence. Alternatively, $A_{ref}$ could be a function of the i and j values, adding complexity to the process, but there would be little reason to do this. One such reason might be where different sources or receivers are used at different locations.

To convert equation (1) to be suitable for inversion, the amplitudes are normalized by defining $b_{ij}$ as follows:

$$b_{ij} = \ln \left| \frac{A_{ij}}{A_{ref}} \right|.$$

Then, equation (1) becomes $$b_{ij} = -(\alpha_i + \alpha_j) z_g. \quad (2)$$

Let $N_s$, be the number of source locations; $N_r$, the number of receiver locations; and K, the number of cells. Then equation (2) can be expressed in a matrix form as $$B = M\alpha \tag{3}$$

where B is a column vector with, before the short offset information is discarded, $N_s \times N_r$ elements; M, a matrix with $N_s \times N_r$ rows and K columns; and $\alpha$, a column vector with K elements. The vector B contains the normalized amplitudes of the first arrivals, and the vector $\alpha$ contains the attenuation coefficients. Only values of $b_{ij}$ corresponding to long offsets are kept; the rest are discarded, which reduces the dimensions of matrix equation (3). The reason for the long-offset limitation is to ensure that the turning wave goes deep enough to completely pass through, in a nearly vertical direction, the shallow layer containing attenuation anomalies. Preferably, the minimum offset retained in vector B should be at least three times the depth of the shallow layer (i.e. $3z_g$).

Each row of the matrix M will then contain all zeroes except for two identical nonzero values ($-z_g$) corresponding to the source and receiver locations. A detailed explanation of equation (3) is set forth in the Appendix below.

The attenuation profile a can be found by iteration. First an initial attenuation profile, $\alpha^{(0)}$, is assumed, and it is used in equation (3) to compute the elements of B, which values will be called $B^{(0)}$. Then, the difference between the observed and computed amplitudes, $\delta B^{(1)}$, is computed:

$$\delta B^{(1)} = B^{obs} - B^{(0)} \tag{4}$$

where $B^{obs}$ is the observed amplitude. From equation (3)

$$\delta B^{(1)} = M\delta\alpha^{(1)}. \tag{5}$$

Equation (5) can be solved by any of several standard matrix inversion methods to obtain $\delta\alpha^{(1)}$. See, for example, the back projection inversion method called "Simultaneous Iterative Reconstruction Technique" in Van der Sluis, A., and van der Vorst, H. A., "SIRT and CG-type methods for the iterative solution of sparse linear least-squares problems", *Lin. Algebra Appl.* 130, 257–302 (1990). Then the new attenuation profile, $\alpha^{(1)}$, is given by $$\alpha^{(1)} = \alpha^{(0)} + \delta\alpha^{(1)}. \tag{6}$$

The above procedure is repeated until the residual, $\delta B$, becomes smaller than a preset value.

The attenuation profile, $\alpha$, is then used to compensate for the shallow attenuation by multiplying each seismic trace in the subject data set by a scale factor $S_{ij}$ where $$S_{ij} = \exp[(\alpha_i + \alpha_j)z_g]. \tag{7}$$

Besides compensating seismic amplitudes for shallow attenuation anomalies the method can be extended to include acquisition-related influences on seismic amplitudes. For example, in order to account for variations in shot strength, equation (1) may be rewritten as $$A_{ij} = (A_{ref} + d_i)\exp[-(\alpha_{h(i)} + \alpha_{h(j)})z_g] \tag{8}$$

where indices i and j now denote shot number i and receiver j, and $A_{ij}$ is the amplitude of the first arrival from shot i recorded at receiver j. The parameter $d_i$ is the anomalous variation in source strength for shot i from a background value. The parameter $\alpha_{h(i)}$ is the attenuation coefficient for cell h(i), where h(i) is the cell where the source emitting the i-th shot was located, and $\alpha_{h(j)}$ is the attenuation coefficient for cell h(j) which is the cell where receiver j was located. Now, $A_{ref}$ is a reference amplitude selected to have minimal influence from both the shallow layer of attenuation anomalies and from the shot strength variation. Ideally, $A_{ref}$ is chosen such that the values of $d_i$ for the various source locations have a mean of zero.

In this implementation, equation (8) cannot be inverted using a simple linear inversion scheme; however, it is still possible to simultaneously solve for $d_i$, $\alpha_{h(i)}$ and $\alpha_{h(j)}$ using any of a number of standard non-linear inversion methods. See, for example, Dennis, J. E., and Schnabel, R. B., *"Numerical Methods for Unconstrained Optimization and Nonlinear Equations"*, Prentice-Hall, Englewood Cliffs (1983). Once $d_i$, $\alpha_{h(i)}$ and $\alpha_{h(j)}$ are known, they can then be used to remove the effects of shallow attenuation and shot strength variability from the seismic data. This is done by multiplying each seismic trace in the subject data set by $\exp[(\alpha_{h(i)} + \alpha_{h(j)})z_g]$, and then adding $d_i$, where i and j correspond to the particular trace. The effects of other similar acquisition-related anomalies such as receiver variations may be removed in a similar manner.

The exponential relationships between $A_{ij}$ and ($\alpha_i$, $\alpha_j$) stated in equations (1) and (8) are only two embodiments of the invention. In a more general form, equation (1) can be rewritten $$A_{ij} = A_{ref} F(\gamma_i, \gamma_j), \tag{9}$$

where $F(\gamma_i, \gamma_j)$ can be any analytical function with independent variables $\gamma_i$ and $\gamma_j$. Furthermore, it is not required by the method to parameterize the near surface attenuation model as cells. It is reasonable to expect that different basis functions may be better suited for certain environments. For example, the attenuation model represented by ($\alpha_i, \alpha_j$) in equation (1) may be parameterized using a basis function representation other than the cellular model described previously. For example, $\alpha$ may be expressed in terms of Legendre polynomials, Chebyshev polynomials, spherical harmonics, or wavelets. Using Legendre polynomials, the attenuation, $\alpha$, as a function of location x would be represented as $$\alpha(x) = \sum_{k=1}^{n} c_k P_k(x)$$

where $P_k(x)$ is the Legendre polynomial of order k. In a similar manner, a two-dimensional $\alpha(x,y)$ can also be expressed as a Legendre polynomial expansion. The previous cellular model can be related to $\alpha(x,y)$ by $\alpha(x,y) = \alpha_i$ when location (x,y) lies in cell i. Using a new basis function in place of the cellular parameterization allows the number of model parameters to be decreased and in many instances will produce a more stable inversion result as well as impose a certain degree of smoothness on the solution. Based on the general form of equation (9), the scale factors $S_{ij}$ would be $$S_{ij} = F^{-1}(\gamma_i, \gamma_j). \tag{10}$$

Attenuation may be frequency dependent. High frequency components usually decay more severely than low frequency components. The present inventive method can be modified as follows to treat frequency dependent attenuation: A bank of band-pass filters is applied to the seismic traces to generate band-pass filtered seismic traces. The above-described method is then applied to each set of the band-pass filtered seismic traces, after which the adjusted amplitudes are recombined.

The present inventive method can be used to restore the amplitudes of reflections from horizons below shallow anomalies for both two-dimensional (2-D) and three-dimensional (3-D) datasets. Although FIG. 1 illustrates the problem in two dimensions, the extension of the preceding method to 3-D datasets will be obvious to one reasonably skilled in the art.

Any initial attenuation profile $\alpha^{(0)}$ can be used. The present inventive method has converged well with no attenuation as the initial guess, i.e., all elements of $\alpha^{(0)}$ set equal to zero.

Experience indicates that 2000 meters may often be taken as an approximate minimum offset for recording turning waves. Preliminary ray tracing can be performed to better determine the appropriate offset range for the inversion in a given situation. At the other end of the range, very long offsets present logistical acquisition problems. Further, the very long offset turning waves necessarily penetrate deeper and may encounter more than just near-surface attenuation effects, thus being inconsistent with the theory of the present invention: Once sufficient data redundancy is obtained with a given offset range, there is no advantage to include longer offsets where problems such as those described above may be present.

The longer offset considerations also illustrate why the present invention is best applied to correct for shallow lying attenuation anomalies. Where the gas pockets or other anomalies lie too deep, relative to the air-water surface in a marine environment or to the air-ground surface in a land environment, longer offsets are required to ensure that the turning waves completely penetrate the layer continuing the attenuation anomalies, in a nearly vertical direction. The longer offsets carry with them the problems discussed above. The practical limit on attenuation anomaly depth for purposes of the present invention will depend on the subsurface environment.

The choice of offset range is clearly data dependent, and guidelines like 2000 m or $3_{z_g}$ for the minimum offset should preferably be reassessed in the context of the particular data. Any seismic data processor who is reasonably skilled in the art will also know to apply any of several front-end processing steps to condition the data before the actual amplitude extraction. Such steps will also be data dependent and may include, for example, first arrival picking and QC (quality control), areal smoothing to minimize acquisition-related amplitude striping, and bandpass and median filters to remove noise and spikes in the data. Preliminary ray tracing, mentioned above in connection with determining an acceptable offset range, is also useful to determine the length of the time window used to compute the turning ray amplitudes in prestack data.

Other limits on the accuracy of the results from the present inventive method include the quality of the picked first arrivals. For example, noise may interfere with the onset of the first arrivals.

Figure 4:
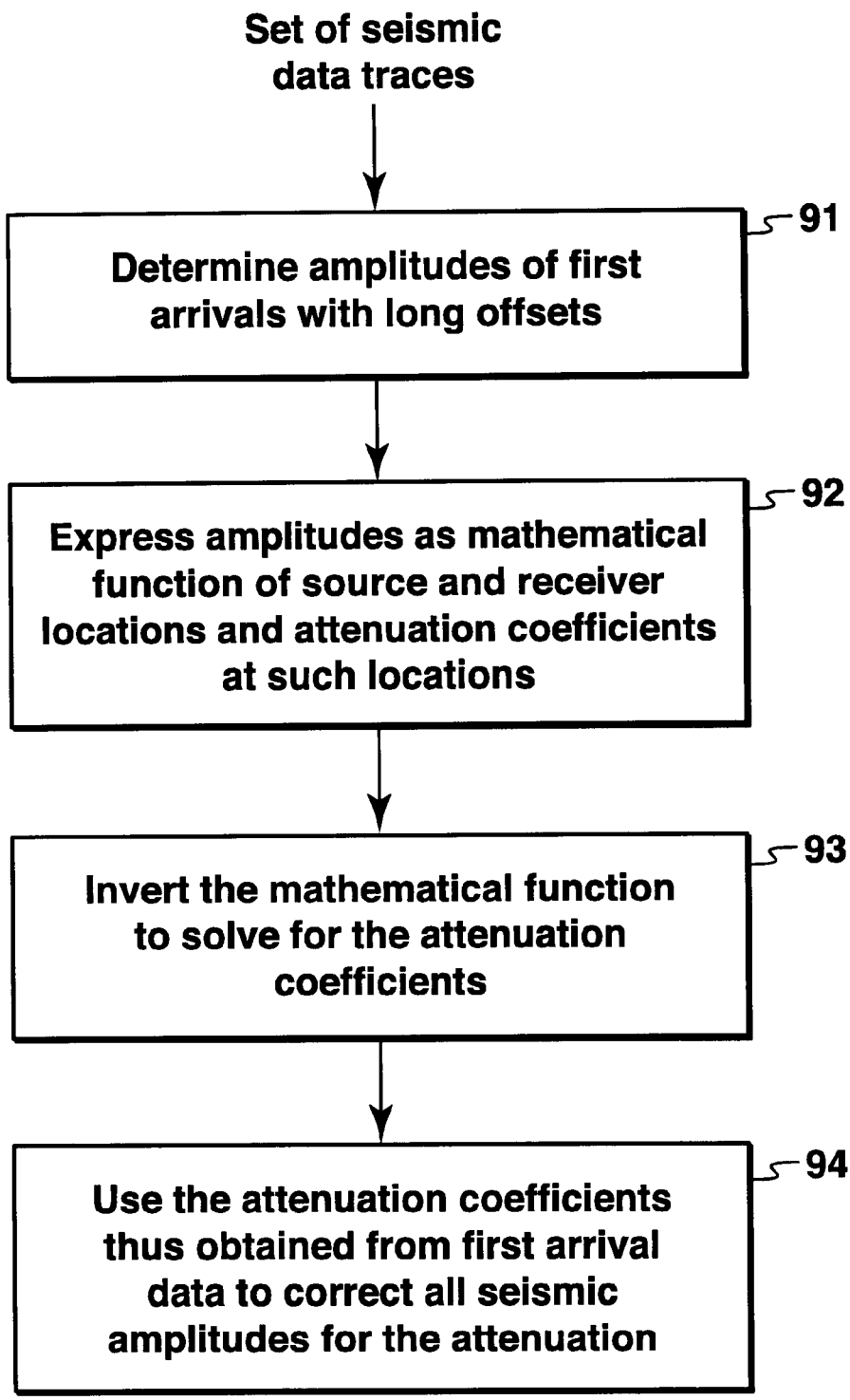
FIG. 4 is a flow chart illustrating some embodiments of the present invention.

At step 91 of FIG. 4, the seismic data traces corresponding to first arrivals with offsets larger than some user-set minimum are collected, and their amplitudes determined.

At step 92, the amplitudes are expressed as a mathematical function of source and receiver locations and of the attenuation coefficients at these locations. Equation (1) is such a mathematical function, shown in more generalized form in equation (9). Equation (3) is an example of the mathematical function expressed in matrix form. Equation (8) is an example of the mathematical function revised to include the effect of source strength variations.

At step 93, the mathematical function is inverted to solve for the attenuation coefficients as a function of spatial position. This is preferably done by an iterative matrix inversion method susch as is formulated in equations (4), (5) and (6). In some preferable embodiments of the present invention, the matrix inversion is done by the back projection inversion method of Van der Sluis and Van der Vorst. Where it is desirable to also account for source and receiver variations, equation (8) may be inverted by non-linear inversion methods, and solutions found for parameters representing these fluctuations as well as for the shallow anomaly attenuation coefficients.

At step 94, the attenuation coefficients (or source/receiver variation parameters) calculated from the first arrival data are used to correct the amplitudes of all the seismic data. Equation (7) shows this correction in mathematical form for one embodiment of the present invention, and equation (10) is amore generalized version of equation (7).

Separate application of the steps of FIG. 4 to the successive frequency ranges of band-pass filtered seismic traces will deal with frequency-dependent attenuation.

The present invention works in both marine and land environments. Marine applications can be simpler because (1) source and receiver variation effects are usually less than on land (although, as described above, the present inventive method can account for some such fluctuations, or source and receiver equalization techniques can be employed; (2) land has a less uniform velocity field than water, producing more complicated ray paths; and (3) land application requires accounting for topography.

Among the benefits of the present invention to petroleum geophysicists are (1) improved lateral reflection continuity for structural interpretation; (2) improved amplitude information for attribute and AVO (amplitude variation with offset) applications; and (3) better seismic amplitudes for controlled amplitude migration. Persons skilled in the art will recognize that the present inventive method can readily be automated and, if desired, included in the user's seismic processing software package of choice.

EXAMPLE

Figure 2:
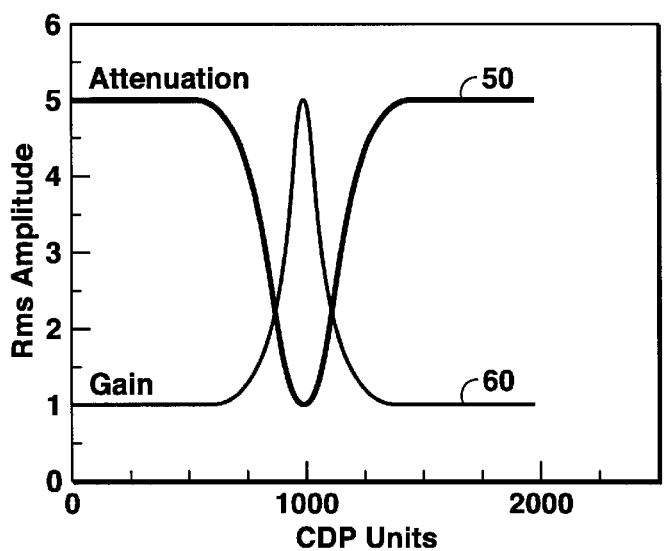
FIGS. 2 and 3 illustrate an example application of the present invention to a model two-dimensional dataset, assuming a Gaussian-shaped attenuation anomaly.
Figure 3:
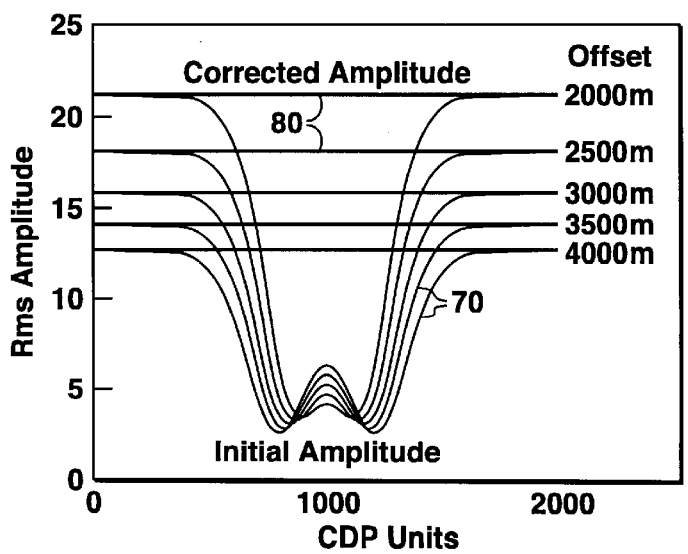

FIGS. 2 and 3 illustrate application of the present invention to a model 2-D dataset. In the model, a simple Gaussian-shaped attenuation anomaly 50 is located at the center of a seismic test line with a maximum 5-to-1 decrease in amplitude (FIG. 2). The depth to the base of the anomaly (not shown in the Figure) is 800 m, which is the value of $z_g$. The width (full width at half max) of the anomaly is about 300 common-depth-point (CDP) "bin" units. A CDP bin is one-half of the receiver spacing. In this example, the receiver spacing is 20 m, so the CDP bin dimension is 10 m, and accordingly the width of the anomaly is approximately 3000 m. The synthetic prestack gathers were generated with offsets ranging from 2000 to 4000 m to ensure that the first arrivals (the turning waves) would reach their turning point below the base of the anomaly. Amplitudes were scaled to simulate geometric spreading by multiplying them by a factor equal to 2000 m/offset. FIG. 3 shows common-offset amplitude plots 70 along the test line, depicting the effects of the attenuation anomaly. The slight amplitude increase in the middle is due to the fact that at this location either the source or the receiver side of each turning wave passes outside the most severe part of the anomaly.

The scale factors were computed using the method of the present invention with a cell size of 100 m. The cell size chosen should be large enough such that most cells are well sampled by the turning waves. FIG. 2 shows resulting scale factors 60, which are obtained after 40 iterations. The scale factors curve 60 shows an inverse relationship with the original attenuation profile 50, showing a maximum value of 5 at the center and tapering down to 1 at the edges of the anomaly. The inverse relationship between the attenuation profile and the scale factors clearly indicates that the present invention mitigates the attenuation caused by the shallow attenuation anomaly.

As further proof that the method works, application of the scale factors 60 to the original prestack data 70 brings the amplitudes back to the level prevailing outside of the anomaly, as shown in FIG. 3. The resulting common-offset, compensated amplitudes 80 are constant along the line, and the effect of the anomaly is eliminated as desired. The lower amplitudes for longer offsets result from geometric spreading that is independent of the anomaly. The horizontal scales of FIGS. 2 and 3 are identical; thus the spatial location of the anomaly is the same in FIG. 3 as in FIG. 2. The scale factors 60 correspond to the $S_{ij}$ of equation (7).

The foregoing description is directed to particular embodiments of the present invention for the purpose of illustrating the invention. It will be apparent, however, to one skilled in the art that many modifications and variations to the embodiments described herein are possible. For example, the present invention may be applied to post-stack data, although the foregoing discussion may assume pre-stack data application in places. In post-stack application, the scale factors are first stacked to simulate the gain contributions from the source and receiver sides. For each bin center, the stack response is approximated by summing through all contributing offsets and incorporating the mute pattern of the data. The stacking process converts the one-way scale factors to two-way surface-consistent scale factors. This also has the effect of smoothing scale factors at later times as more offsets contribute to the stack. While this simulated stacking process is only an approximation of the pre-stack gain application, it nevertheless maintains the lateral variations of the pre-stack scale factors. Pre-stack amplitude compensation, however, is usually simpler to implement and, because of the approximation referred to above, more accurate than post-stack application. All such modifications and variations are intended to be within the scope of the present invention, as defined in the appended claims.

APPENDIX

The purpose of this Appendix is to further explain equation (3) above through consideration of the following very simplified example. Assume one line of seismic data, with the line divided into six cells (K=6). The source is alternately located at each cell midpoint ($N_s$=6) with five receivers, one located in each of the other five cells ($N_r$=5). Equation (3) then becomes $$\begin{bmatrix} a_{12} \\ a_{13} \\ a_{14} \\ a_{15} \\ a_{16} \\ \vdots \\ a_{65} \end{bmatrix} = \begin{bmatrix} -z_g & -z_g & 0 & 0 & 0 & 0 \\ -z_g & 0 & -z_g & 0 & 0 & 0 \\ -z_g & 0 & 0 & -z_g & 0 & 0 \\ -z_g & 0 & 0 & 0 & -z_g & 0 \\ -z_g & 0 & 0 & 0 & 0 & -z_g \\ \vdots & \vdots & \vdots & \vdots & \vdots & \vdots \\ 0 & 0 & 0 & 0 & -z_g & -z_g \end{bmatrix} \begin{bmatrix} \alpha_1 \\ \alpha_2 \\ \alpha_3 \\ \alpha_4 \\ \alpha_5 \\ \alpha_6 \end{bmatrix}$$

Assume that the long-offset limitations can be expressed as $|j-i| \geq 3$, for source in the i-th cell and receiver in the j-th cell. Discarding data not satisfying this limitation, the preceding equation becomes $$\begin{bmatrix} a_{14} \\ a_{15} \\ a_{16} \\ \vdots \\ a_{63} \end{bmatrix} = \begin{bmatrix} -z_g & 0 & 0 & -z_g & 0 & 0 \\ -z_g & 0 & 0 & 0 & -z_g & 0 \\ -z_g & 0 & 0 & 0 & 0 & -z_g \\ \vdots & \vdots & \vdots & \vdots & \vdots & \vdots \\ 0 & 0 & -z_g & 0 & 0 & -z_g \end{bmatrix} \begin{bmatrix} \alpha_1 \\ \alpha_2 \\ \alpha_3 \\ \alpha_4 \\ \alpha_5 \\ \alpha_6 \end{bmatrix}$$

This equation is now compact enough to show all the terms:

$$\begin{bmatrix} a_{14} \\ a_{15} \\ a_{16} \\ a_{25} \\ a_{26} \\ a_{36} \\ a_{41} \\ a_{51} \\ a_{52} \\ a_{61} \\ a_{62} \\ a_{63} \end{bmatrix} = \begin{bmatrix} -z_g & 0 & 0 & -z_g & 0 & 0 \\ -z_g & 0 & 0 & 0 & -z_g & 0 \\ -z_g & 0 & 0 & 0 & 0 & -z_g \\ 0 & -z_g & 0 & 0 & -z_g & 0 \\ 0 & -z_g & 0 & 0 & 0 & -z_g \\ 0 & 0 & -z_g & 0 & 0 & -z_g \\ -z_g & 0 & 0 & -z_g & 0 & 0 \\ -z_g & 0 & 0 & 0 & -z_g & 0 \\ 0 & -z_g & 0 & 0 & -z_g & 0 \\ -z_g & 0 & 0 & 0 & 0 & -z_g \\ 0 & -z_g & 0 & 0 & 0 & -z_g \\ 0 & 0 & -z_g & 0 & 0 & -z_g \end{bmatrix} \begin{bmatrix} \alpha_1 \\ \alpha_2 \\ \alpha_3 \\ \alpha_4 \\ \alpha_5 \\ \alpha_6 \end{bmatrix}$$

Note that this system is twelve equations in six unknowns ($\alpha_1, \ldots, \alpha_6$). Numerical (iterative) solution methods are highly desirable even in this very simplified example because of (a) the large number of simultaneous equations, and (b) the fact that in this example the system of simultaneous equations is overdetermined. Numerical methods employing techniques such as least squares enable a best fit set of solutions to the overdetermined system to be found. The accuracy of the matrix inversion process benefits from data redundancy.

It will be obvious that the preceding example assumes certain things—e.g., that the same number of receiver locations are used for each source location—that are not necessary for the present invention to work. As can readily be seen, the number of receiver locations per source location does not have to be constant. Accordingly, the number of rows in matrix M, after discarding short-offset data, can more generally be expressed as $$\sum_{i=1}^{N_s} N_{ri}$$

where $N_{ri}$ is the number of long-offset receiver locations corresponding to the source in the i-th cell, and the summation is over all cells in which a source is located (i.e., it is not necessary that $N_s$=K). It should also be obvious that the present invention will not yield an updated value of α for a cell in which neither a source nor a receiver is ever located. Similarly, the cells do not have to be uniform in size.

The present invention is not limited by those assumptions used herein for illustrative or explanatory purposes.

Following is a similar simple example of the present inventive method applied to a situation with no shallow subsurface layer of attenuation anomalies and no receiver variations, but where corrections are desired for seismic source variations. For such an application, equation (8) reduces to $$A_{ij}=A_{ref}=d_i.$$

Assume shot fluctuations are due to using two seismic sources, each of which produces consistent shots, but not identical to the shots of the other. Assume three receivers are used. Then, the values i and j can have are i=1, 2, and j 1, 2, 3.

The equation above can now be written as the matrix equation $$A=MD$$

where A is a column vector with six elements, D a column vector with two elements, and M is a 6×2 matrix, i.e., $$\begin{bmatrix} A_{11} - A_{ref} \\ A_{12} - A_{ref} \\ A_{13} - A_{ref} \\ A_{21} - A_{ref} \\ A_{22} - A_{ref} \\ A_{23} - A_{ref} \end{bmatrix} = \begin{bmatrix} 1 & 0 \\ 1 & 0 \\ 1 & 0 \\ 0 & 1 \\ 0 & 1 \\ 0 & 1 \end{bmatrix} \begin{bmatrix} d_1 \\ d_2 \end{bmatrix}$$

In this simple example, the matrix equation reduces to six ordinary equations in two unknowns ($d_1$ and $d_2$) that are not even simultaneous equations. Using the equation redundancy to give a more precise result by averaging yields $$d_1 = \frac{1}{3}\sum_{j=1}^{3} A_{1j} - A_{ref}, \text{ and}$$

$$d_2 = \frac{1}{3}\sum_{j=1}^{3} A_{2j} - A_{ref}.$$

In a more complex example, linear matrix inversion techniques are used to obtain best fit solutions to $d_1, d_2 \ldots$ in some embodiments of the present invention.

We claim:

1. A method for correcting for amplitude variations in a set of seismic data traces where said variations are caused by a shallow subsurface layer containing attenuation anomalies and/or by seismic source and receiver inconsistencies, said method comprising the steps of:
   a. determining first arrival amplitudes for seismic traces having offsets greater than a predetermined value, said predetermined value being large enough to ensure that said first arrivals pass completely through said shallow layer;
   b. expressing said amplitude variation for said long-offset first arrivals as a mathematical function of location of said source and receivers, and of location-dependent variables, said variables determining the magnitude of said amplitude variations;
   c. inverting said mathematical function to solve for said variables; and
   d. using said variables determined from said first arrival data to correct the amplitudes of all arrivals in said set of seismic traces for said amplitude variations.

2. The method of claim 1, wherein inversion of said mathematical function is done using iterative nonlinear matrix inversion techniques.

3. The method of claim 1, wherein the surface area surrounding said source and receiver is divided into a plurality of numbered, discrete cells, said source and receiver inconsistencies are ignored, and said mathematical function is expressed in the form $$A_{ij}=A_{ref}F(\gamma_i,\gamma_j),$$

where $A_{ij}$ is said first arrival amplitude for said source in cell i and a receiver in cell j;

F is an analytical function of variables $\gamma_i$ and $\gamma_j$;

$\gamma_i$ is said variable representing attenuation by said shallow subsurface layer under cell i;

$\gamma_j$ is said variable representing attenuation by said shallow subsurface layer under cell j; and $A_{ref}$ is a first arrival reference amplitude selected to have substantially minimal influence from said causes of amplitude variations.

4. The method of claim 3, wherein $\gamma_i$ and $\gamma_j$ are reexpressed in terms of attenuation coefficients $\alpha_i$ and $\gamma_j$ respectively, where $\gamma_i = \alpha_i z_g$;

$\gamma_j = \alpha_j z_g$;

$z_g$=a nominal thickness for the attenuation anomaly layer; and wherein $$F=\exp[-(\alpha_i+\alpha_j)z_g].$$

5. The method of claim 4, wherein said mathematical function expressed as a matrix equation is $$B=M\alpha$$

where B is a column vector having N elements $b_{ij}$;

$$b_{ij} = \ln\left|\frac{A_{ij}}{A_{ref}}\right|;$$

M is a matrix with N rows and K columns, wherein each row contains only two nonzero values corresponding to source and receiver cells, each said value being $-z_g$;

$N_s$ is the number of source locations from which said traces are generated in said survey;

$$N = \sum_{i=1}^{N_s} N_{ri};$$

$N_{ri}$ is the number of long offset receiver locations for source in said i-th cell; and K is the number of said cells.

6. The method of claim 5, wherein said reference amplitude is a function of offset, being the average amplitude for all first arrivals having a common offset.

7. The method of claim 5, wherein said source and receivers are located on a line and said survey is a two-dimensional survey.

8. The method of claim 5, wherein said source and receivers are located at points in a two-dimensional array and said survey is a three-dimensional survey.

9. The method of claim 5, wherein said predetermined minimum offset is at least 3 $z_g$.

10. The method of claim 5, wherein said inversion of said matrix equation technique is performed using the back projection inversion method called "Simultaneous Iterative Reconstruction Technique".

11. A method for compensating for amplitude attenuation in a set of seismic data traces, said amplitude attenuation being caused by a shallow subsurface layer containing attenuation anomalies, said method comprising the steps of:
  a. dividing the frequency range of said set of seismic data traces into a plurality of pass bands and obtaining band-pass filters for said plurality of pass bands;
  b. applying said band-pass filters to said set of seismic data traces to generate a plurality of sets of band-pass filtered seismic data traces;
  c. selecting band-pass filtered seismic data traces from said sets of band-pass filtered seismic data traces and determining first arrival amplitudes for said band-pass filtered seismic data traces having offsets greater than a predetermined value, said predetermined value being large enough to ensure that said first arrivals pass completely through said shallow layer;
  d. expressing said amplitude attenuation of said first arrivals as a mathematical function of location-dependent attenuation coefficients;
  e. determining said attenuation coefficients by inverting said mathematical function;
  f. determining said attenuation coefficients to construct scale factors, and using said scale factors to scale the amplitudes of other arrivals in said sets of band-pass filtered seismic data traces; and
  g. combining amplitude-scaled band-pass filtered seismic data traces having the same source and receiver locations to obtain amplitude-compensated seismic data traces.

12. The method of claim 11, wherein said seismic traces are produced by a seismic source and at least one receiver, said source and receiver spatial locations being specified in terms of a plurality of numbered, discrete cells, and said mathematical function expressed as a matrix equation is $$B = M\alpha$$

where B is a column vector having N elements $b_{ij}$;

$$b_{ij} = \ln\left|\frac{A_{ij}}{A_{ref}}\right|;$$

$A_{ij}$ is the first arrival amplitude for said source in cell number i and a receiver in cell number j;

$A_{ref}$ is a reference amplitude selected to have substantially minimal influence from said attenuation anomalies;

$\alpha$ is a column vector with K elements $\alpha_i$;

$\alpha_i$ is the attenuation coefficient of the i-th cell;

M is a matrix with N rows and K columns, wherein each row contains only two nonzero values, each said value being $-z_g$, corresponding to source and receiver cells;

$z_g$ is the thickness of the attenuation anomaly layer;

$N_s$ is the number of source locations from which said traces are generated in said survey;

$$N = \sum_{i=1}^{N_s} N_{ri};$$

$N_{ri}$ is the number of long offset receiver locations for source in said i-th cell; and K is the number of said cells.

13. The method of claim 1, wherein said shallow subsurface layer and said receiver inconsistencies are ignored, said amplitude variations being caused only by said source inconsistencies, each shot from said source is numbered by index i and each receiver used to collect said seismic data is numbered by index j, and wherein said mathematical function is expressed in the form $$A_{ij} = A_{ref} + d_i$$

where $A_{ij}$ is said first arrival amplitude for said trace resulting from shot i and detected by receiver j;

$A_{ref}$ is a first arrival reference amplitude selected to have substantially minimal influence from said source inconsistencies; and $d_i$ is said amplitude variation caused by inconsistency in shot i.

14. The method of claim 13, wherein said mathematical function is solved for $d_i$ using linear matrix inversion techniques.

15. The method of claim 1, where said source and receiver inconsistencies are ignored, and said variables representing attenuation by a shallow subsurface layer are coefficients in a Legendre polynomial expansion of the spatial dependence of said attenuation anomaly.

16. The method of claim 1, wherein said source and receiver inconsistencies are ignored, and said variables representing attenuation by a shallow subsurface layer are coefficients in a wavelet expansion of the spatial dependence of said attenuation anomaly.

* * * * *